March 26, 1929.  W. BLASKEWITZ ET AL  1,706,648
HANDLE STRUCTURE FOR TORCH TANKS
Filed Oct. 7, 1927
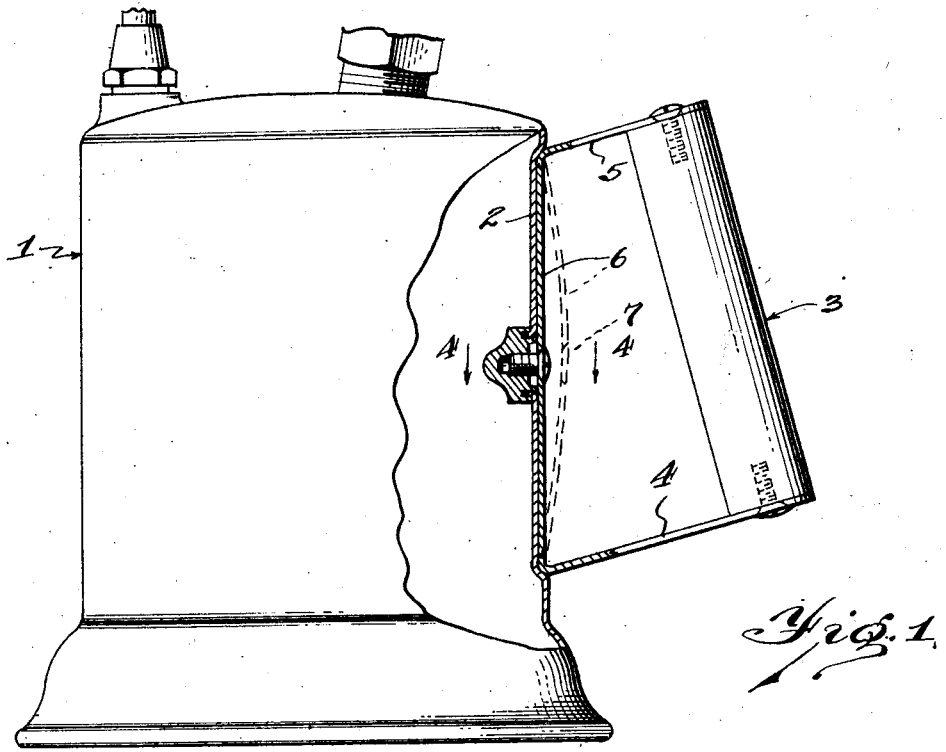
Fig. 1
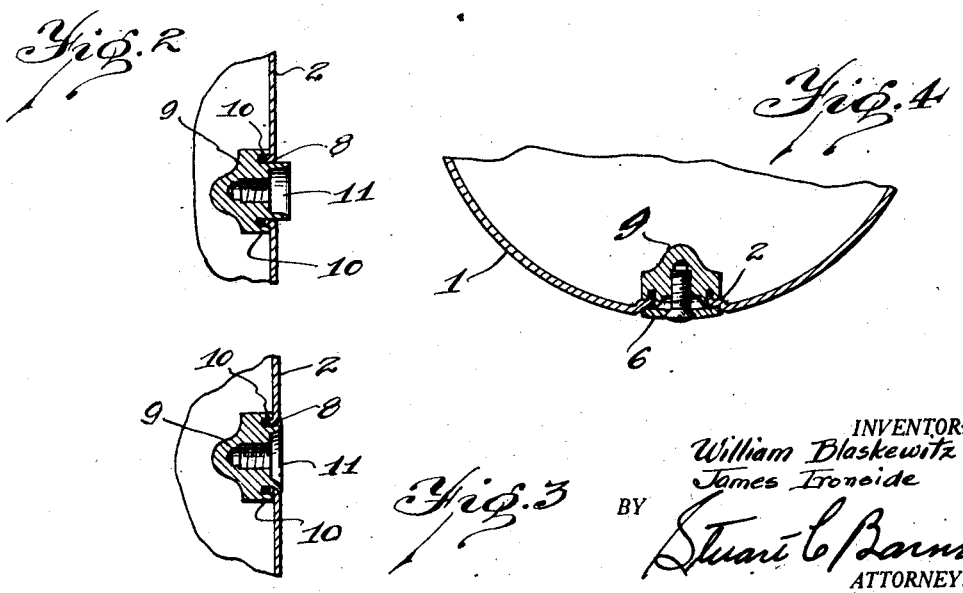
Fig. 2
Fig. 4
Fig. 3
INVENTORS
William Blaskewitz
James Ironside
BY
Stuart C. Barnes
ATTORNEY.

Patented Mar. 26, 1929.

1,706,648

UNITED STATES PATENT OFFICE.

WILLIAM BLASKEWITZ AND JAMES IRONSIDE, OF DETROIT, MICHIGAN, ASSIGNORS TO CLAYTON & LAMBERT MANUFACTURING COMPANY, OF DETROIT, MICHIGAN, A CORPORATION OF MICHIGAN.

HANDLE STRUCTURE FOR TORCH TANKS.

Application filed October 7, 1927. Serial No. 224,743.

This invention relates to handle structure for torch tanks and has to do particularly with a novel and extremely simple tank and handle structure so cooperating as to make a very compact, strong and inexpensive structure.

Heretofore in the manufacture of tanks for torches, and similar structures, many attempts have been made to provide a suitable handle structure and method of securing the same to the tanks. As the tanks are usually drawn out of relatively thin sheet drawing brass, the walls are relatively thin, and it has been somewhat of a problem to properly secure a handle to the tank that will be inexpensive, stand rough usage and not tend to rupture or cause leaks in the tank. Probably the most satisfactory handle structure for torch tanks and the like, has been the forming of two openings in the tank shell and reinforcing the openings with suitable reinforcing means, and then securing the handle by means of two separate arms to the reinforcing means through the two openings. Such a structure has given fairly satisfactory service, but it is necessarily expensive both in structure and assembly features.

It is the object of the present invention to provide an extremely simple, compact and strong handle structure for torch tanks and the like, and which handle structure is relatively inexpensive both as to structure and assembly. We obtain this simplicity and compactness by providing only one handle opening in the tank and utilizing a handle structure having a metallic connecting arm formed of one piece, but U shaped so as to fit the handle. This single handle arm is secured to the tank at the single point by a novel securing means so as to render the joint solid, strong and leafproof, and the handle is prevented from turning by stamping, or forming a suitable depression longitudinally of the tank, in alignment with a single opening whereby the single U shaped handle arm fits closely within the depression. This depression not only reinforces the tank at the point of handle assembly, but also provides a large bearing surface around the handle arm to positively prevent turning of the handle.

In the drawings:

Fig. 1 is a fragmentary, front elevation partly in section of a torch tank embodying our invention and illustrating in dotted lines and solid lines the position of the handle arm before and after assembly.

Fig. 2 is a fragmentary sectional view illustrating the step of forming the reinforcing nut to the inside of the shell at the single handle perforation.

Fig. 3 is a view similar to Fig. 2 showing the manner of spinning over the annular projection of the reinforcing nut.

Fig. 4 is a detail sectional view taken on line 4—4 of Fig. 1.

In illustrating the present invention we have shown the same as being embodied in a standard torch tank, but it will be understood that the novel handle structure of the present invention may be suitably adapted to other tank structures presenting a similar problem as to strength, compactness and inexpensive design.

In Fig. 1 we have illustrated a standard torch tank which may be generally designated 1, the usual burner and torch structure at the top being left off. This tank structure is preferably of the usual construction, being drawn out of a flat sheet of special deep drawing brass whereby to make the entire tank or shell without a seam. This is only the preferred construction, as it will be understood that the tank or shell may be made in any manner desired. A portion of the side of the tank is stamped and otherwise suitably depressed, as at 2, so as to form a rectangular, longitudinal depression, the face of which is preferably arcuate and concentric with the circular shell.

The handle for this torch tank is generally designated 3 and is preferably formed of a grip and a one piece metallic handle element, the lower leg 4 being preferably longer than the upper leg 5 whereby the handle grip will extend slightly upwardly and at an angle to the axis of the torch tank. This one piece metallic handle structure is thus U shaped and the attaching portion of the handle is preferably curved, as shown in dotted lines at 6, before being secured to the torch tank. The metallic handle structure, as thus shown in Fig. 4, is preferably of flat strip stock which may be easily bent into shape by suitable dies or forms, and the longer attaching portion 6 is preferably arcuate in cross section corresponding to the arcuate shape of the depression 2. Centrally positioned in the attaching portion 6 is a tapered aperture for receiving a suitable attaching screw lug, or securing means.

The rectangular longitudinal depression 2 is perforated, as best shown at 8 in Fig. 2, and the edges of this perforation are turned inwardly to form an annular ring projection. In order to tightly seal this perforation 8, and at the same time provide a reinforcing and attaching means for the handle, we have provided a suitable attaching nut 9, which is preferably a machine screw product having an annular recess 10 for receiving the inturned edge of the perforation 8. A suitable ring of solder is preferably inserted in the bottom of this recess 10 and the nut 9 is forced through the aperture 8 until the inturned edge of the aperture presses the ring of solder into the bottom of the annular depression 10. The nut 9 is also provided with a suitable annular extension 11 which is adapted to be spun over, as shown in Fig. 2, whereby to rigidly secure the nut in position. Heat is then applied to the nut and adjacent portion of the tank whereby to melt the solder which then fills all the crevices and spaces between the nut and the shell so that it will tightly seal the same.

In assembling this simple combination of handle and tank structure, the handle 3 is placed against the depression 2 of the tank as shown, and the leg 6 of the handle is arcuately spaced from the depression 2, as shown in dotted lines in Fig. 1. A suitable screw is then inserted through the aperture 7 and this screw is then projected forwardly into the threaded portion of the nut 9, at the same time drawing the portion 6 of the handle into contacting relation with the surfaces of the depression 2. The resiliency of portion 6 of the handle serves as a lock washer for the screw, and by drawing this curved portion 6 into position, it will also tightly force the edges of the portion 6 against both the top and side edges of the depression 2. This will insure a very compact and non-rattling structure.

It will thus be seen that we have provided a novel combination of a tank and handle structure, the handle structure itself being very simple and inexpensive, and formed of a single strip of material, the tank being formed of a reinforcing depression and provided with a single opening for receiving a single nut for securing the handle to the tank, the depression in the tank not only reinforcing the tank, but also preventing turning of the handle, and the initial arcuate shaping of the handle insuring a tight, rigid and compact connection between the handle and the tank. This novel combination not only presents a very inexpensive initial structure for a handle structure, but applicants have found that it very materially reduces the cost of assembly.

What we claim is:

1. In combination with a torch tank having a hollow shell forming a part of the tank, a handle formed in part of strip stock, means for securing the handle to the shell at a single point, and means forming an integral part of the shell for holding the handle in upright position.

2. In combination with a torch tank having a hollow shell structure forming a reservoir, a portion of the shell being off-set to form a reinforcing portion of a handle element positioned in said off-set portion, and reinforcing means for securing the handle element in the off-set portion.

3. An article of the class described comprising in combination a handle having a single attaching means, a shell forming a reservoir, and a reinforcing depression in the shell for receiving said single handle attaching means, an aperture in said depression, and reinforcing means inserted in said aperture for sealing and reinforcing the same and for securing the handle attaching means to the shell.

4. In combination with a torch tank having a hollow shell structure, a handle formed of strip stock and having an attaching portion arcuately spaced from the shell when initially applied to the shell, and securing means passing through said attaching portion and into the shell for drawing said attaching portion into alignment and contact with the shell surface.

5. In combination with a torch tank having a hollow shell structure, and a rectangular longitudinal depression formed therein parallel with the axis of the shell structure, a handle comprising a strip of metal approximately the length and width of the depression, and a single means passing through the shell and the depressed portion for securing the handle to the shell.

6. An article of the class described comprising in combination a cylindrical hollow shell forming a reservoir, a longitudinal rectangular depression formed in the shell parallel with the axis therof, the base of said depression being concentric with the shell, a handle having a single attaching portion positioned in said depression and engaging the sides and bottom thereof, and a single securing means located centrally of the said depression and attaching portion for rigidly securing the attaching portion in the depression.

7. An article of the class described, comprising a shell, a depression formed therein, a handle formed of strip stock having a main engaging portion, two arms and a grip portion positioned at an angle to the axis of the shell, and means for securing the engaging portion of the handle in contacting relation with the bottom and sides of the said depression.

8. In combination with a tank having a hollow shell structure and a depression formed therein, a handle formed of strip stock and having an attaching portion engaging the shell at two points but arcuately spaced from the shell when initially applied thereto, and securing means passing through said attaching portion and into the shell depression for drawing said attaching portion into alignment and contact with the shell surface.

9. In combination with a tank having a hollow shell structure and a depression therein, a handle formed of strip stock and having an attaching portion arcuate in cross section and arcuately spaced from the shell when initially applied thereto, and securing means for drawing the arcuate attaching-portion of the handle into alignment and contacting relation with the bottom of the depression formed in the shell.

10. In combination with a tank comprising a shell and a depression formed therein, a handle formed of strip stock having a main engaging portion arcuate in cross section, a grip portion and two arms of unequal length whereby to position the grip portion of the handle at the ends of the arms and at an angle to the axis of the shell, and means for securing the engaging portion of the handle in contacting relation with the bottom and sides of the said depression.

In testimony whereof we affix our signatures.

WILLIAM BLASKEWITZ.
JAMES IRONSIDE.